Sept. 17, 1935.　　　C. O. GUERNSEY　　　2,014,731
CUSHION WHEEL
Filed Dec. 30, 1933
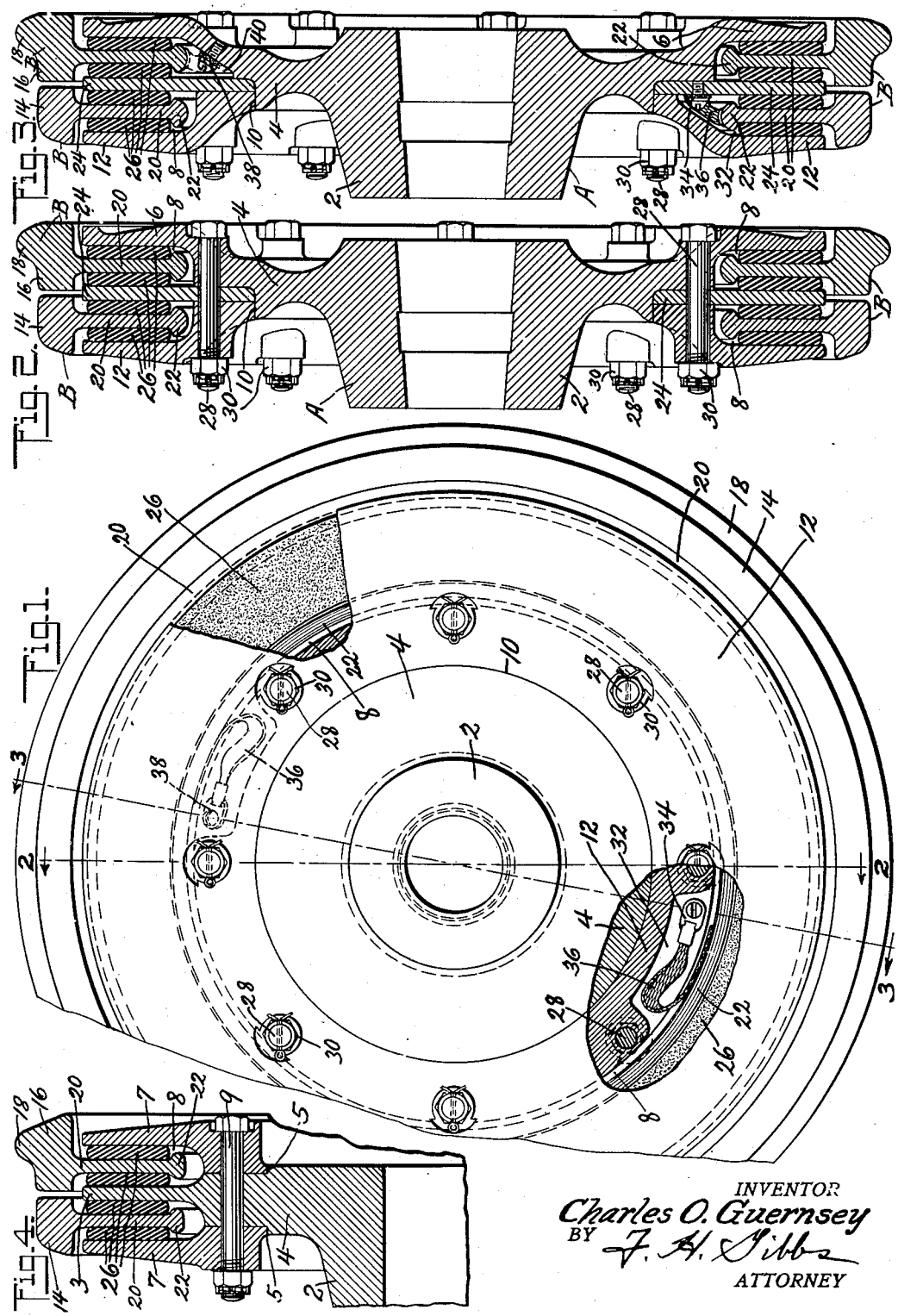
INVENTOR
Charles O. Guernsey
BY
ATTORNEY Patented Sept. 17, 1935

2,014,731

UNITED STATES PATENT OFFICE 2,014,731

CUSHION WHEEL

Charles O. Guernsey, Yeadon, Pa.

Application December 30, 1933, Serial No. 704,611

1 Claim. (Cl. 295—11)

This invention relates generally to wheels and has particular reference to cushion or resilient wheels adapted for use with railway cars or other vehicles. The drawing herein discloses the invention as applied to a railway car wheel.

One object of this invention is the provision of a cushion wheel of strong and durable construction in which the resiliency is increased with a substantially even distribution of the stresses and strains to which the wheel is subjected in service.

Another object of this invention is the provision of a cushion wheel adapted particularly for use with railway cars and in which the tread thereof is supported or carried by resilient material so arranged as to be subjected to shearing action when the wheel is in service.

Still another object of this invention is the provision of a railway car wheel having independent tread sections supported by rubber or other suitable resilient material so arranged as to be subjected to shearing action when the wheel is in service.

A further object of this invention is the provision of a railway car wheel having independent tread sections supported by rubber or other suitable resilient material held in compression and subject to shearing action when the wheel is in service.

A still further object of this invention is the provision of a railway car wheel having independent tread sections supported by a series or plurality of rubber annuli retained in place by compression exerted transversely or laterally of the wheel and subject to shearing action when the wheel is in service.

Still another object of this invention is the provision of a railway car wheel having independent tread sections supported by a series or plurality of rubber annuli retained by compression exerted transversely of the wheel and subject to shearing action when the wheel is in service whereby to permit movement of the tread sections relative to each other.

Other objects and advantages of this invention will be apparent from the following description taken in conjunction with the accompanying drawing in which:

Figure 1 is a fragmentary side elevation of the wheel of the present invention, certain parts being broken away to disclose other parts in section;

Fig. 2 is a sectional view on the line 2—2, Fig. 1;

Fig. 3 is a sectional view on the line 3—3, Fig. 1, and

Fig. 4 is a fragmentary sectional view of the wheel showing a modified form of the invention.

Referring now more particularly to Figs. 1 to 3, inclusive, the car wheel shown therein comprises generally a main or body portion A and a tread portion B, the body portion including a hub 2 and a web 4 formed integral with the hub, the outer portion of the web being outwardly offset as at 6 to provide one wall of an annular channel 8. Adjacent the hub 2, the web 4 is so formed as to provide an annular shoulder 10 upon which a clamping ring 12 is supported, said clamping ring forming the opposite wall of the channel 8, as will be obvious.

The tread B comprises independent sections 14 and 16, respectively, the latter being provided with a rail flange 18, and each section having an internal, substantially circular, supporting flange 20 provided with a head 22, said flanges, as clearly shown in the drawing, extending into the channel 8 in substantially parallel relation and on opposite sides of a spacer member 24 supported on shoulder 10 and interposed between the clamping ring 12 and web 4.

The tread sections 14 and 16 are supported by a plurality or series of resilient annuli 26 formed of rubber or the like, arranged on opposite sides of the flanges 20, the outer rubber annuli being arranged between the walls of channel 8 and the flanges 20, while the inner annuli are interposed between the flanges 20 and the spacer member 24.

For securing the tread sections, bolts 28 are provided which extend through the web 4, spacer member 24 and clamping ring 12 and are tightened by means of nuts 30 whereby to compress the annuli 26 transversely of the wheel and force said annuli into close, substantially adhesive relation with the walls of the channel 8 and the flanges 20 of the tread sections 14 and 16.

In the form of the invention shown in Fig. 4 the spacer element is formed integral with the hub 2 and constitutes an extension 3 of the web 4, said web being provided on opposite sides thereof with supporting shoulders 5 each of which is adapted to support a clamping ring 7. The clamping rings 7 constitute the walls of the channel 8 and are secured in position by bolts 9, which compress the rubber annuli 26.

In order to ground electric current the wheel of the present invention has a recess 32 formed in the clamping ring 12 to accommodate a bond 34 which is connected by means of conductor 36 to a bond 38 arranged in a recess 40 formed in the web 4, as clearly shown in Figs. 1 and 3.

It is believed that the construction and operation of the wheel of the present invention will be fully apparent to those skilled in the art, in view of the description herein, but attention is called to the fact that in service, the tread sections 14 and 16 are capable of movement relative to each other because of the specific mounting thereof by the rubber annuli; the movement of said sections subjecting the annuli to shearing action. The wheel of the present invention provides for greater comfort of the traveling public due to the specific mounting of the tread sections 14 and 16 and a railway car equipped with wheels of the present invention will be more quiet in operation than those now in present-day use.

The drawing herein illustrates certain embodiments of the invention, but it is to be understood it is for illustrative purposes only and certain changes in the form and proportions of the constructions may be made within the scope of the appended claim without departing from the spirit of the invention.

What is claimed is:

In a railway car wheel including a pair of spaced tread members having supporting flanges, a hub having an integral web extending to a point immediately beneath the tread members, a shoulder formed in the side wall of said web, a plurality of spaced ring members fixed to said web and seating on said shoulder, and a resilient annulus arranged on each side of each supporting flange and clamped under compression transversely against adjacent ring faces.

CHARLES O. GUERNSEY.